United States Patent [19]

Ishida et al.

[11] Patent Number: 5,106,434
[45] Date of Patent: Apr. 21, 1992

[54] METHOD FOR PRODUCING A METAL AND CERAMIC HEAT-CONNECTED BODY

[75] Inventors: Noboru Ishida; Masaya Ito; Mitsuyoshi Kawamura, all of Nagoya, Japan

[73] Assignee: NGK Spark Plug Co., Ltd., Aichi, Japan

[21] Appl. No.: 685,668

[22] Filed: Apr. 16, 1991

Related U.S. Application Data

[60] Division of Ser. No. 385,991, Jul. 24, 1989, Pat. No. 5,066,547, which is a continuation of Ser. No. 39,602, Feb. 18, 1986, abandoned.

[30] Foreign Application Priority Data

Feb. 18, 1985 [JP] Japan .................................. 60-29685

[51] Int. Cl.$^5$ ............................................. C21D 1/18
[52] U.S. Cl. ........................................ 148/127; 156/84; 228/903
[58] Field of Search ................ 148/127; 228/122, 903; 156/83, 84

[56] References Cited

U.S. PATENT DOCUMENTS 4,778,345 10/1988 Ito et al. .............................. 148/144
4,897,311 1/1990 Oda et al. ............................ 428/472

Primary Examiner—Richard O. Dean
Assistant Examiner—George Wyszomierski
Attorney, Agent, or Firm—Fish & Richardson

[57] ABSTRACT

In heat-connections between metal and ceramic, martensite stainless steel or martensite heat-resistant steel which can be hardened by quenching in a gas or vacuum after having been heated beyond the quench hardening temperature thereof are used as metal. The heat connection is by brazing or shrinkage fit at 800° C. or more. Stress strain caused by a difference in thermal expansion coefficient between the two can be reduced. Further, since the metal can be connected to the ceramic while hardening the metal, man-hours can be reduced markedly.

28 Claims, 2 Drawing Sheets

METHOD FOR PRODUCING A METAL AND CERAMIC HEAT-CONNECTED BODY

This application is a division of U.S. application Ser. No. 07/385,991, filed Jul. 24, 1989, now U.S. Pat. No. 5,066,547, which is a continuation of application Ser. No. 07/039,602, filed Feb. 18, 1996, now abandoned.

BACKGROUND OF THE INVENTION

1. Field of the Invention

The present invention relates to a metal and ceramic heat-connected body and more specifically to a body heat-connected of a ceramic and a highly hard metal (as for a shaft having a sliding portion), which is usable as a rocker arm for an engine including a ceramic tip and a metal arm, or a turbine rotor including a ceramic blade wheel and a metal shaft.

2. Definition

The term "heat-connect" herein generally denotes that two members are connected or jointed by application of heat at 800° C. or higher.

3. Description of the Prior Art

Ceramic material is excellent in heat and corrosion resistance and small in specific gravity. Therefore, utilization of ceramic material is now being studied for rocker arm tips, turbine blades, auxiliary chambers of internal combustion engines, etc. However, it is desirable to use ceramics in combination with metal because of its brittleness. By the way, brazing, pressure fit, shrinkage fit, expansion fit, etc. are well known as methods of connecting or jointing ceramics and metal. However, in the case where ceramic components are small in size as in rocker arms or a strong connecting strength is required between the two at high temperatures as in turbine rotors, high-temperature heat-connection method such as brazing or shrinkage fit is usually adopted.

SUMMARY OF THE DISCLOSURE

In high-temperature heat-connection between ceramic and metal, since metal is readily annealed through the heat-connection it is impossible to directly use the connected metal per se as sliding components for products. Accordingly, it is usually necessary to harden the metal portion through a heat treatment process after the metal has been connected with ceramics. In this process, the heat treatment temperature should, of course, be by about 50° C. lower than the connecting temperature, thus raising a problem in that it is impossible to obtain sufficient metal hardness. On the other hand, when the treatment temperature is set to a sufficiently high temperature, there exists another problem such that cracks may be produced in ceramics because of internal stress caused by thermal strain after the heat treatment, and further, at the worst, ceramics may be broken, during a subsequent oil or water quenching process.

In addition, since there exists a big difference in the thermal expansion coefficient between metal and ceramics, stress strain usually remains at the connected portion due to the coefficient difference between the two, thus deteriorating durability at the connected portion of the body.

Accordingly, an object of the present invention is to provide a novel body in which highly hard metal and ceramics are strongly heat-connected to each other while solving the above-mentioned problems involved in the prior art metal and ceramic heat-connected body.

In the present invention, martensite stainless steels or martensite heat-resistant steels, which can be hardened within a gas or vacuum after having been heated above the quench hardening temperature, are used as metal to be heat-connected to ceramics. Here, heat-connection implies all the methods such as brazing, shrinkage fit and the like connecting or jointing techniques in which at least the connected end of metal is connected to ceramics at a high temperature of 800° C. or higher. It is preferred that the martensite phase constitutes a major phase in the hardened metal, e.g., at least 50 vol % (more preferably 80 vol %) of the entire metal.

In the metal and ceramic heat-connected body according to the present invention, the metal is high in hardness and additionally the heat-connected body is high in connection strength. Further, since it is possible to connect metal with ceramic while hardening the metal, man-hour can be reduced markedly.

The basic concept of the present invention is based on the following points:

(1) connecting temperature of metal and ceramic composit articles is high, because the connected portion thereof is usually exposed to a high temperature in use;

(2) martensite stainless steel and martensite type heat-resistant steel are typically by about 0.5% expanded due to martensite transformation at the cooling upon quench hardening process; and (3) there exist some metals which can be hardened even by cooling in a gas or vacuum atomosphere among various martensite stainless steels and martensite heat-resistant steels.

In more detail, since the heat-connecting temperature is equivalent or higher than the quench hardening temperature (generally about 700° to about 1100° C.) of the metal concerned and further the heat-connected metal can be hardened within a gas or vacuum atmosphere, the metal to be connected is simultaneously heated above the quench hardening temperature and then cooled for hardening the metal during the same heating and cooling processes for connecting the metal with ceramics. Further, since the connected metal is one of martensite stainless steels or martensite heat-resistant steels and the metal is by at least 0.02% (preferably at least 0.1%, and most preferably, at least 0.5%) expanded due to martensite transformation during the cooling process, it is possible to reduce stress strain caused by the difference in thermal expansion coefficients between the metal and ceramics at the connected portion thereof. As the metals to be used for the present invention, it is possible to give an example of martensite heat-resistant steel such as SUH-616 steel, SUH-600 steel, etc. which includes 0.02 to 3 wt % of at least one element selected from Mo, W and V, or of martensite stainless steel such as SUS-440, SUS-420, SUS-403, AISI-618, etc. which includes a relatively high content of carbon e.g., about 0.1–about 1.5 wt %. In those metals, the hardness HRC becomes sufficiently high so as to assure excellent wear resistance, i.e., 40 or more (preferably 45 or more, most preferably 50 or more) through the heat-connection of the present invention. However, without being limited to those metals hereinabove specifically mentioned, all the martensite stainless steels or martensite heat-resistant steels which can be quench hardened within the predetermined temperature range are applicable to the present invention. The above temperature range is preliminarily determined by measuring a range within which atmosphere for heat-connection is controllable. Further, the metal applied to the present invention is not limited to the exemplified additive elements or the amounts thereof.

The quench hardening can be carried out by cooling from the heat connection for the particular metal employed in the joint immediately after the heat connection has been performed. A suitable cooling rate for respective metal connected should be maintained during the cooling procedure, e.g., at least 10° C./min (preferably at least 30° C./min ) during the temperature range where the transformation from austenite to martensite (herein referred to as martensite transformation) occurs. The martensite transformation temperature range depends greatly upon the type of steel and the cooling rate itself, thus such range should be determined by a preliminary testing. The quench hardening temperature range of the metal is defined so as to provide the hardened HRC of at least 40 which is sufficient to provide excellent wear resistance. Accordingly the quench hardening temperatures of the present invention for the respective metals may be slightly lower than those as specified in the known standard quench hardening temperature (e.g., appearing in JIS or "Kinzoku [=Metal] Data Book", 1974 edited by Japan Institute of Metallurgy, page 117, Table 5.2 2, a copy thereof will be submitted for reference). In the present invention the heating temperature for the quench hardening may be as follows:

| metal | present invention | standard quenching |
| --- | --- | --- |
| SUS-420 J2 | ≧880° C. air* | 1000–1050° C. oil** |
| SUS-440 | ≧900° C. air | 1010–1070° C. oil |
| SUH-600 | ≧900° C. air | 1020–1070° C. oil |
| SUH-616 | ≧900° C. air | 1020–1070° C. oil |

*air cooling
**oil quenching

It should be noted that combination of brazing and shrinkage fit may be employed as shown in FIG. 4A and FIG. 4B, wherein the numerals 3 and 6 indicate brazing and shrinkage fit, respectively, and the numeral 7 indicates clearance. Heating can be made at one time for both while heating in two times may be effected, too. This combination of heat-connection provides a more stable and secure connection.

The ceramics applicable in the present invention embraces heat resistant ceramics such as silicon nitride ($Si_3N_4$, thermal expansion coefficient $\alpha$ of $3.0 \times 10^{-6}$/°C. within a temperature range between room temperature R.T. and 1000° C.), silicon carbide (SiC $\alpha = 4.6 \times 10^{-6}$/°C. between R.T. and 1200° C.), and alumina ($\alpha = 8.0 \times 10^{-6}$/°C. between R.T. and 900° C.). Other ceramics having similar properties may be employed in the present invention.

Brazing joint may be applied as the heat-connection wherein brazes should have a brazing temperature of at least 800° C. (preferably not exceeding 1200° C., more preferably 900°–1170° C.). The shirinkage fit temperature of the metal should be at least 800° C. (preferably not exceeding 1200° C., more preferably 900°–1170° C.). In summary the heat-connection should be effected at a temperature within the temperature range of 800°–1200° C. (more preferably 900°–1170° C.).

The brazes applicable in the braze joint are set forth below:

| braze | brazing temperature (°C.) |
| --- | --- |
| pure Ag | 1000 |
| 80Ni-15Cr-5B | 1065–1205 |
| 89Ni-11P | 925–1095 |
| 70Ni-30Ti | 950–1200 |
| 72Ag-28Cu eutectic | 780–900 |
| 50Cu-50Ti | 900–1050 |

(composition by weight %)

In the following preferred embodiments of the present invention will be described in more detail with reference to the accompanying drawings.

DETAILED DESCRIPTION OF THE PREFERRED EMBODIMENTS

Example 1

Figure 1:
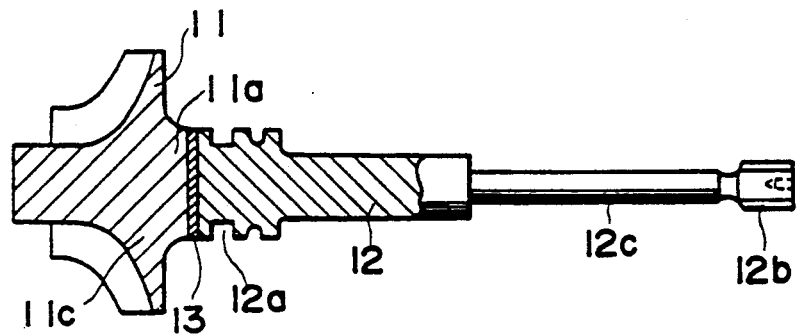
FIG. 1 is a cross-sectional view showing an embodiment of the heat-connected body according to the present invention, which is applied to a turbine rotor.

FIG. 1 is a cross-sectional view showing an example of the heat-connected body according to the present invention, which is designed to be applied to a turbine rotor. The reference numeral 11 denotes a blade wheel made of silicon nitride sintered body with a thermal expansion coefficient of $3.0 \times 10^{-6}$/°C. (R.T. to 1000° C.). The blade wheel 11 was formed with a blade wheel axle 11a projectingly provided on the rear surface of a hub portion integral with the blade wheel, in order to connect the blade wheel 11 to a metal shaft operatively connected with a compressor wheel (not shown). The numeral 12 denotes a metal shaft made of SUH-616 for operatively connecting the blade wheel 1 with the compressor wheel. A seal ring groove 12a was formed in the metal shaft 12 on the end portion thereof near the blade wheel. The numeral 13 denotes a brazing material Ni—Ti (70Ni-30Ti by wt %) for connecting the blade wheel 11 and the metal shaft 12. The turbine rotor as described above was manufactured by heat-connecting the blade wheel 11 to the metal shaft 12 with the Ni—Ti brazing material 13 on the end surface of the blade wheel axle 1a of the blade wheel 11 at a temperature of 1020° C. in vacuum of $10^{-6}$ Torr and thereafter lowering the temperature to room temperature at a cooling rate of 60° C./min. The hardness of the metal shaft 12 was $H_{RC} = 52$ after having been heat-connected to the blade wheel 11. Only the other end of the metal shaft 2 remote from the blade wheel 11 was heated to 600° C. with a burner to be tempered. After the metal shaft 12 had been threaded by a lathe, finished, and balanced in rotational moment, the shaft 12 was assembled in a turbo charger having a slide bearing portion made of Pb coated brass to receive the metal shaft 12 at the quench hardened portion thereof. The turbo charger was equipped on a test in line engine of 6 cylinders with a combustion chamber volume of 2000 cc. As a result of a durability test for 500 hours at 100,000 rpm, it was confirmed that the wear was 1 micrometer or less at the slide bearing portion. Further, the tensile strength of the connected portion between the blade wheel 11 and the metal shaft 12 was 20 kg/mm².

Example 2

Two turbine rotors were manufactured under the same conditions as in the first embodiment except that the material of the metal shafts 12 were SUH-600; the heat-connecting temperature was 1100° C. and 930° C., respectively; and the rate of temperature lowering after the heat-connection was 65° C./min. The measured hardness of the metal shaft 12 was $H_{RC}=50$ and 40, respectively. In the same manner as in Example 1, after having been assembled in a turbo charger, run-stop cycle tests of each 1000 times (running for 300 sec and stop for 300 sec) have been performed. However, it has been found no wear at the bearing portions of the metal shafts. Further, the tensile strength between the blade wheel 11 and the metal shaft 12 was 15 kg/mm² and 13.5 kg/mm², respectively, at the connected portion.

Example 3

Figure 2:
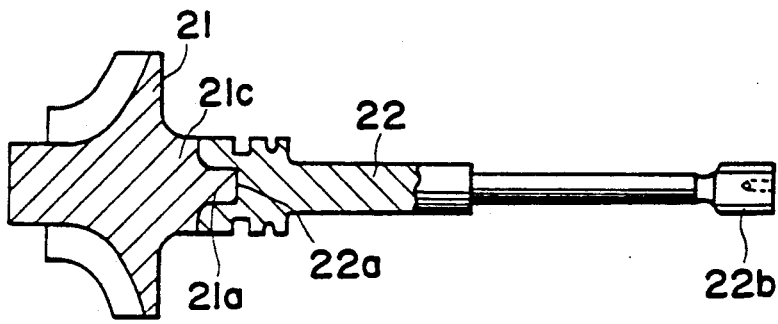
FIGS. 2 and 3 are cross-sectional views showing another embodiment of the present invention.
Figure 3:
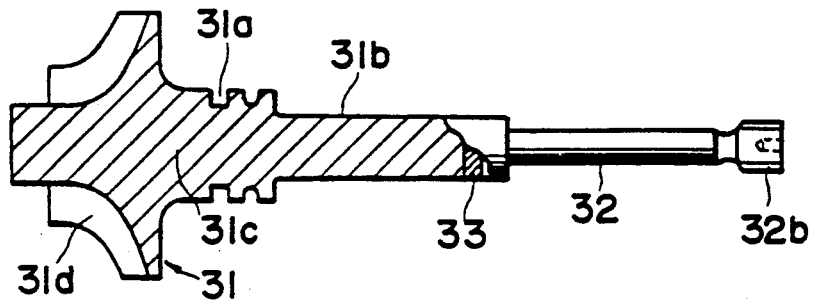
Figure 4A:
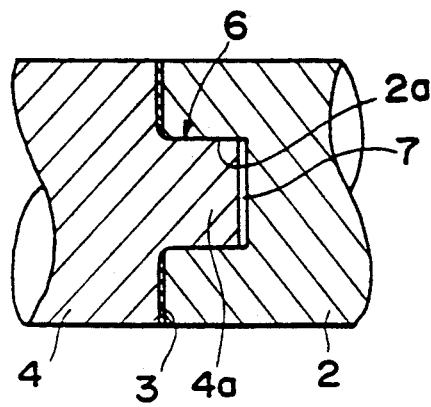
FIGS. 4A and 4B are cross-sectional views showing further embodiments of the present invention.
Figure 4B:
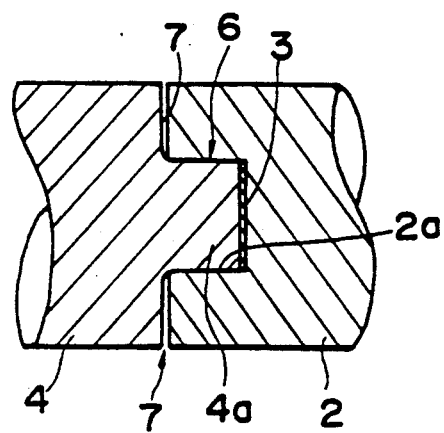

FIG. 2 is a cross-sectional view showing another embodiment of the heat-connected body according to the present invention, which is applied to a turbine rotor. The reference numeral 21 denotes a blade wheel made of silicon nitride sintered body with a thermal expansion coefficient of $3.0 \times 10^{-6}/°C$. (as Example 1). The blade wheel 21a was formed with a blade wheel axle 21a projectingly provided on the rear surface of a hub portion integral with the blade wheel, in order to connect the blade wheel 21a to a metal shaft operatively connected with a compressor wheel (not shown). The numeral 22 denotes a metal shaft made of SUH-600. A recess 5a was formed in the end surface of the metal shaft 22 on the blade wheel side. The blade wheel axle 21a is connected to this recess by shrinkage fit. The turbine rotor as described above has been manufactured by heating the blade wheel 21a and the metal shaft 22 to 1100° C. and shrinkage-fitting the two with a fitting overlap dimension of 90 micrometer. The measured hardness of the metal shaft 22 was $H_{RC}=47$ after the heat-connection. In the same way as in the second Example, a run-stop cycle test was performed. However, no wear has been found at the slide bearing portion of the metal shaft.

What is claimed is:

1. A method for heat-connecting a metal member and a ceramic member to form a metal and ceramic heat-connected body, comprising:
   providing a metal member which is of a martensitic stainless steel or a martensitic heat-resistant steel capable of being quench hardened at a quench hardening temperature in a gas or vacuum,
   providing a ceramic member;
   heat-connecting the metal and ceramic members to form an integral body at a temperature of at least the quench hardening temperature of the metal member, and
   cooling the integral body to a temperature below the quench hardening temperature of the metal member in a gas or vacuum at a cooling rate that provides quench hardening to a Rockwell hardness HRC of at least 40 through martensite transformation of the metal member.

2. The method as set forth in claim 1, wherein the metal member is heated to 800° C. or more for the heat-connection.

3. The method as set forth in claim 1, wherein the cooling rate is at least 10° C./min.

4. The method as set forth in claim 3, wherein the cooling rate is at least 30° C./min.

5. The method as set forth in claim 3, wherein the cooling is carried out down to room temperature.

6. The method as set forth in claim 1, wherein the heat-connection is effected by brazing, shrinkage fit or both.

7. The method as set forth in claim 6, wherein said shrinkage fit is effected by heating the metal member.

8. The method as set forth in claim 6, wherein the heat-connection is effected by brazing through heating at least the connecting portions of both members above the quench hardening temperature of the metal.

9. The method as set forth in claim 8, wherein the heating is effected to a temperature ranging from 800° C. to 1200° C.

10. The method as set forth in claim 6, wherein the heating is effected to a temperature ranging from 800° C. to 1200° C.

11. The method as set forth in claim 10, wherein the heating is effected to a temperature ranging from 900° C. to 1170° C.

12. The method as set forth in claim 1, wherein the cooling is carried out so that the metal member is quench hardened to a Rockwell hardness HRC of at least 45.

13. The method as set forth in claim 1, wherein the metal member has a quench hardening temperature of at least 800° C. and the ceramic member has a coefficient of thermal expansion of about $8 \times 10^{-6}/°C$. or less.

14. The method as set forth in claim 13, wherein the cooling rate is at least 10° C./min.

15. The method as set forth in claim 14, wherein the cooling rate is at least 30° C./min.

16. The method as set forth in claim 14, wherein the cooling is carried out down to room temperature.

17. The method as set forth in claim 13, wherein the heat-connection is effected by brazing, shrinkage fit or both.

18. The method as set forth in claim 17, wherein the shrinkage fit is effected by heating the metal member.

19. The method as set forth in claim 17, wherein the heat-connection is effected by brazing through heating at least connecting portions of both members above the quench hardening temperature of the metal member.

20. The method as set forth in claim 19, wherein the heating is effected to a temperature from 800° C. to 1200° C.

21. The method as set forth in claim 17, wherein the heating is effected to a temperature from 800° C. to 1200° C.

22. The method as set forth in claim 21, wherein the heating is effected to a temperature from 900° C. to 1170° C.

23. The method as set forth in claim 13, wherein the cooling is carried out so that the metal member expands at least 0.1% through the martensite transformation during the cooling subsequent to the heat-connection.

24. The method as set forth in claim 13, wherein the cooling is carried out so that the metal member expands at least 0.5% through the martensite transformation during the cooling subsequent to the heat-connection.

25. The method as set forth in claim 13, wherein the cooling is carried out so that the metal member is quench hardened to a Rockwell harness HRC of at least 45.

26. The method as set forth in claim 25, wherein the metal member is quench hardened to a Rockwell hardness HRC of at least 50.

27. The method as set forth in claim 13, wherein the ceramic member has a coefficient of thermal expansion of no more than about $4.6 \times 10^{-6}/°C$.

28. The method as set forth in claim 13, wherein the ceramic member is a sintered body of a ceramic selected from the group consisting of silicon nitride, silicon carbide, alumina and mixtures thereof.

* * * * *